United States Patent Office 2,951,840
Patented Sept. 6, 1960

2,951,840
6-FLUORO PREGNANES AND INTERMEDIATES THEREFOR

Howard J. Ringold, Albert Bowers, Octavio Mancera, and George Rosenkranz, all of Mexico City, Mexico, assignors to Syntex S.A., Mexico City, Mexico, a corporation of Mexico No Drawing. Filed July 21, 1958, Ser. No. 749,652

Claims priority, application Mexico July 20, 1957

15 Claims. (Cl. 260—239.55)

The present invention relates to cyclopentanophenanthrene derivatives and to a process for the production thereof.

More particularly the present invention relates to 6α-fluoro 9α-halo (bromo, chloro or fluoro) derivatives of cortisone, hydrocortistone, 1-dehydro-cortisone and 1-dehydro-hydrocortisone, as well as to their 21-esters with hydrocarbon carboxylic acids of less than 12 carbon atoms. The compounds just referred to are valuable glucocorticoid hormones having anti-inflammatory properties and may be administered by all of the methods and in well known combinations with pharmaceutical carriers. The present invention also relates to certain novel methods for the production of these compounds and to novel intermediates.

In our U.S. patent application Serial No. 740,550, filed June 9, 1958, there is disclosed the novel cortical hormone 6α-fluorohydrocortisone and its 21-esters. In accordance with one of the methods of the present invention it has been discovered that the 21-esters of 6α-fluoro-hydrocortisone, and especially the 21-acetate, may be used as a starting material for the production of the novel 9α-halo compounds previously referred to. Thus upon dehydration with thionyl chloride an additional double bond at C-9(11) is produced to give the novel intermediate i.e. the 21-acetate of 6-fluoro-Δ4,9(11)-pregnadien-17α,21-diol-3,20-dione. Addition of hypobromous acid to the double bond then gave the 21-acetate of 6α-fluoro-9α-bromo-hydrocortisone. This compound is a key intermediate in the process since it may be converted to its 1-dehydro derivative by reaction with selenium dioxide and to the corresponding 9α-chloro and 9α-fluoro compounds by conversion to the intermediate 9β,11β-oxido derivative. The same sequence may also be applied to the 6α-fluoro prednisolone acetate of the previously mentioned prior application. Another novel method for the production of the compounds of the present invention involves starting with the 21-acetate of cortisone, 9α-fluoro cortisone or 9α-fluoro hydrocortisone, converting these compounds to their enol acetates and treating the enol acetates with sodium borohydride to selectively reduce the 20-keto group, saturate the C-3(4) double bond and hydrolyze the ester groups. Reesterification to the tetraacetate of Δ5-pregnen-3β,17α,20,21-tetrol-11-one (or its 9α-fluoro or chloroanalogues) and epoxidation gave the corresponding 5α,6α-epoxide. The epoxide ring was then opened with boron trifluoride etherate to give the corresponding 3,17,20,21-tetracetate of 6β-fluoro-pregnan-3β,5α,17α,20,21-pentol-11-one. The acetyl groups at C-3, 20 and 21 were preferentially saponified, and the hydroxyl group at C-21 preferentially acetylated to give the 17,21-diacetate. This diacetate was then oxidized to give the corresponding 17,21-diacetate of 6β-fluoro-pregnan-5α,17α,21-triol-3,11,20-trione (or its 9α-chloro or fluoro derivatives). Treatment of these last compounds with dry hydrogen chloride in acetic acid solution dehydrated at C-5 and inverted the 6β-fluoro to 6α to produce the 17,21-diacetate of 6α-fluoro-cortisone or its 9α-halo (chloro or bromo) derivatives. If the dehydration was preformed with thionyl chloride the diacetate of 6β-fluoro-cortisone or its 9α-halo derivatives (chloro or bromo) was formed.

Certain of the novel compounds of the present invention may be illustrated by the following formulas:

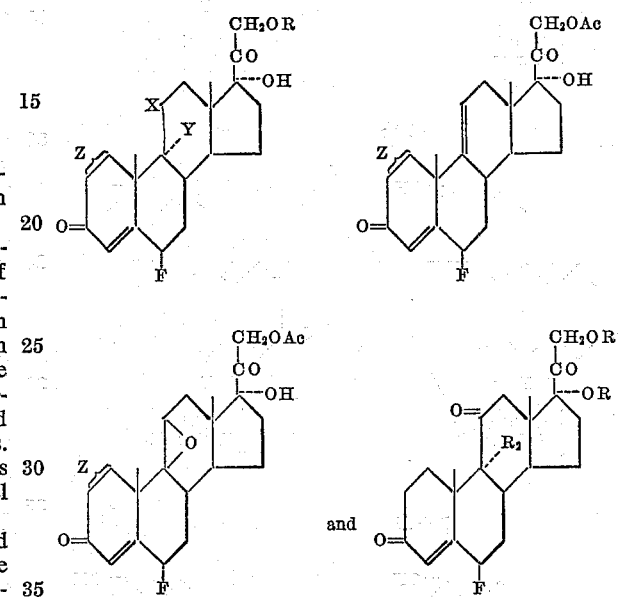

In the above formulas X represents =O and

Z represents a double bond between C-1 and C-2 or a saturated linkage. Y represents chloro, bromo or fluoro, R represents hydrogen or a hydrocarbon carboxylic acid acyl group of less than 12 carbon atoms which may be saturated or unsaturated, straight or branched chain aliphatic, cyclic or mixed cycloic-aliphatic and may be substituted conventionally as by halogen. Typical acyl groups of this type are acetate, propionate, cyclopentylpropionate, benzoate, caproate, trimethylacetate, phenoxypropionate and β-chloropropionate. Ac represents acetate. $R_2$ represents hydrogen, chloro or fluoro.

One of the process for the production of the compounds of the present invention may be illustrated by the following equation.

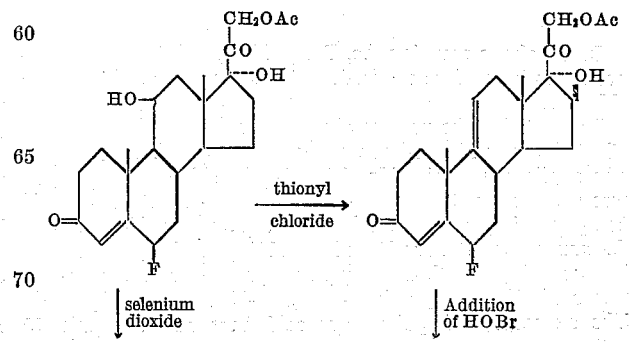

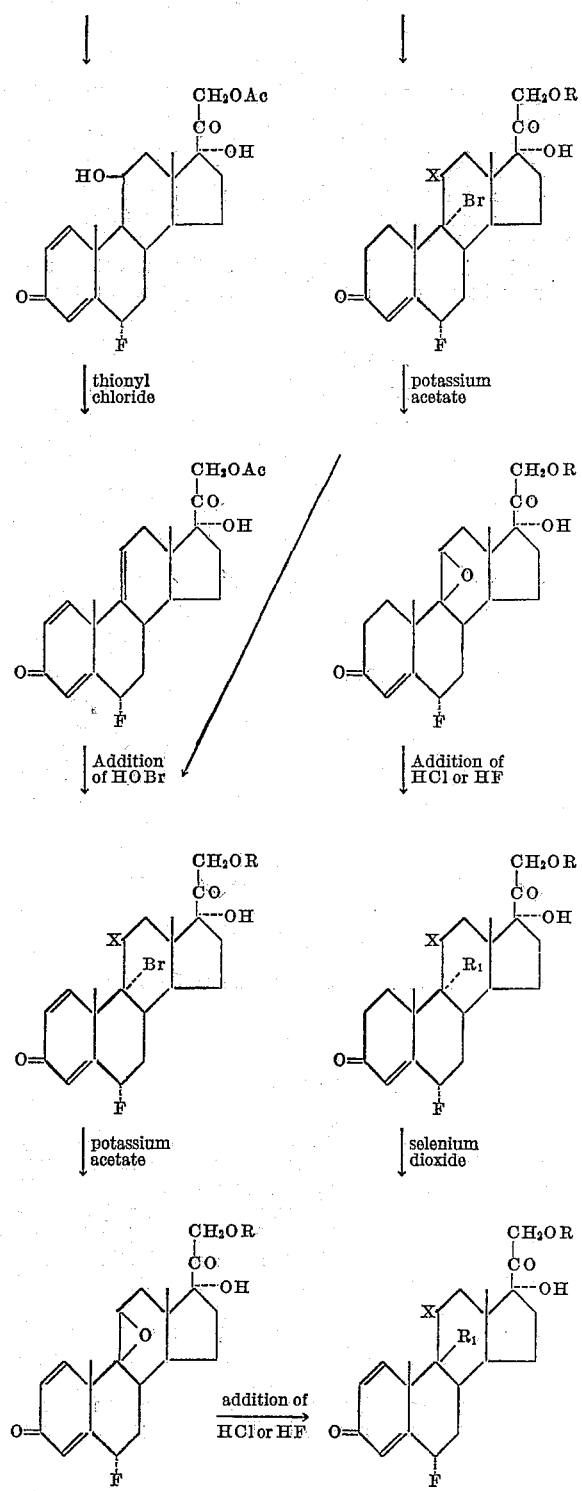

In the above equation Ac, R and X represent the same groups as heretofore set forth. $R_1$ represents fluorine or chlorine.

In practicing the process above set forth the 21-acetate of 6α-fluoro-hydrocortisone prepared in accordance with our application Serial No. 740,550, filed June 9, 1958, was used as the starting material. The treatment of such compound in pyridine solution with thionyl chloride at 0° C. caused the introduction of an additional double bond between C-9 and C-11 to produce the 21-acetate of 6-fluoro-$\Delta^{4,9(11)}$ - pregnadien - 17α,21 - diol - 3,20-dione. The elements of hypobromous acid were added to this diene, for example by treatment of its dioxane solution with N-bromoacetamide and perchloric acid, to produce the 21-acetate of 6α-fluoro-9α-bromo-hydrocortisone. Oxidation of the hydroxyl group at C-11, for example with chromic acid in aqueous acetic acid solution, produced the 21-acetate of 6α-fluoro-9α-bromo-cortisone.

For the introduction into these compounds of an additional double bond between C-1 and C-2, they were refluxed with selenium dioxide, preferably in mixture with t-butanol, in the presence of pyridine and under an atmosphere of nitrogen.

Starting from the 21-acetate of 6α - fluoro - 9α - bromo-hydrocortisone, there was thus obtained the 21-acetate of 6α-fluoro-9α-bromo-prednisolone. The treatment of the 21-acetate of 6α - fluoro - 9α - bromo - cortisone with selenium dioxide produced the 21-acetate of 6α - fluoro-9α-bromo-prednisone.

In turn, the 21-acetate of 6α - fluoro - 9α - bromo-hydrocortisone is the key compound for preparing other 6α-fluoro - 9α - halo compounds such as the 21-acetates of 6α-fluoro-9α-chloro-hydrocortisone and of 6α,9α-difluoro-hydrocortisone.

The 21-acetate of 6α-fluoro-9α-bromo-hydrocortisone was refluxed in ethanol solution with anhydrous potassium acetate to form the 21-acetate of 6α-fluoro-9β, 11β-oxido-$\Delta^4$-pregnen-17α,21-diol-3,20-dione; by the addition of the elements of hydrogen chloride, this oxido-compound was converted into the 21-acetate of 6α-fluoro-9α-chloro-hydrocortisone, while reaction with hydrogen fluoride led to the formation of the 21-acetate of 6α,9α-difluoro-hydrocortisone. The reaction with the hydrogen halides was preferably carried out in chloroform solution, at low temperature and under anhydrous conditions.

By a similar method of oxidation to that of the 21-acetate of 6α-fluoro-9α-bromo-hydrocortisone, we also oxidized these 9α-chloro and 9α-fluoro compounds to convert the hydroxyl group at C-11 to a keto group, and thus we obtained the 21-acetates of 6α-fluoro-9α-chloro-cortisone and of 6α,9α-difluoro-cortisone. Dehydrogenation of these compounds afforded the corresponding di-halo derivatives of prednisone. It is obvious that the oxidation of the 11β-hydroxyl group can also be carried out as a final operation, that is, after the dehydrogenation, to convert the prednisolone derivatives into those of prednisone.

As mentioned before, we used the 21-acetate of 6α-fluoro-hydrocortisone as the starting material for the present invention. Now, alternatively, instead of first carrying out the dehydration of this compound, the introduction of the additional double bond between C-1 and C-2 can be effected first and then the halogen atom at C-9α introduced. Dehydration of 6α-fluoro-prednisolone with thionyl chloride yielded the corresponding 1,4,9(11)-triene. By the method described previously, the reaction with N-bromoacetamide gave the 21-acetate of 6α-fluoro-9α-bromo-prednisolone, which upon treatment with potassium acetate furnished the corresponding 9β,11β-epoxide. Reaction of the latter with hydrogen chloride or fluoride produced, respectively, the 21-acetate of 6α-fluoro-9α-chloro-prednisolone and of 6α,9α-difluoro-prednisolone, identical to the compounds obtained by halogenation of 6α-fluoro-hydrocortisone and subsequent introduction of the additional double bond between C-1 and C-2.

The 21-acetoxy groups of the 6α-fluoro-9α-halo compounds thus prepared were saponified, preferably by reaction with sodium methoxide under an atmosphere of nitrogen, to form the corresponding 21-hydroxy compounds, which in turn were conventionally reesterified to produce the corresponding 21-esters of hydrocarbon carboxylic acids of less than 12 carbons of the novel 6α-fluoro-9α-halo derivatives as previously set forth. The esterification at C-21 was preferably carried out by reaction with anhydrides or chlorides of such acids in pyridine solution.

Another method for the preparation of certain of the compounds of the present invention is illustrated as follows.

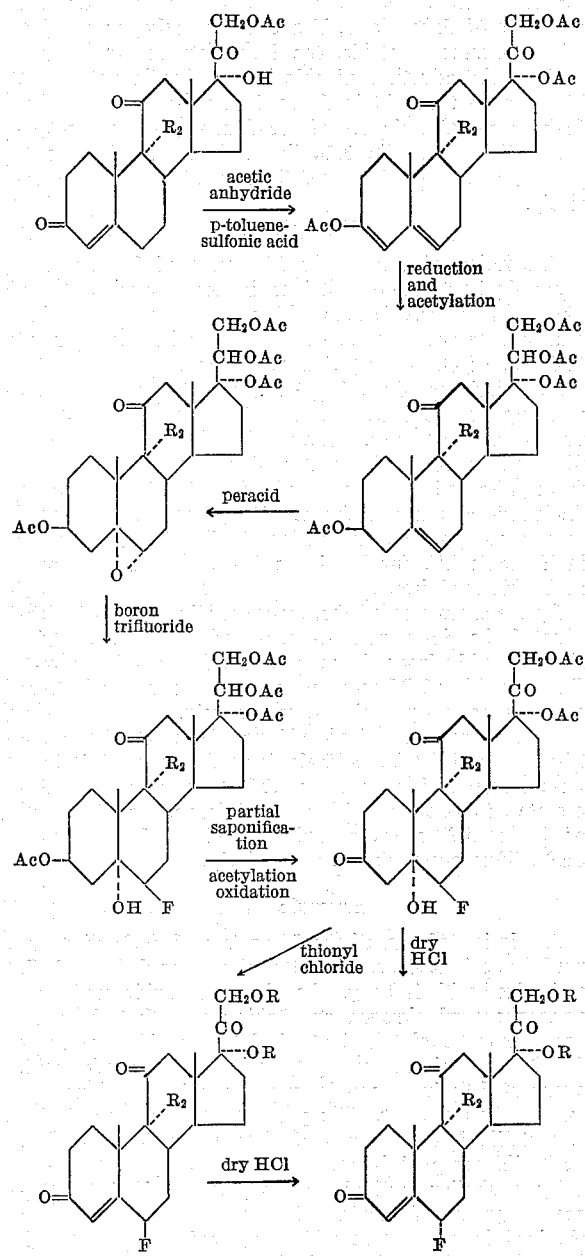

In the above formula Ac, R and $R_2$ represent the same groups as heretofore set forth.

In practicing the process above set forth the 21-acetate of cortisone, or of 9α-chloro-cortisone or of 9α-fluoro-cortisone ($R_2$ is hydrogen, chloro or fluoro) is treated with acetic anhydride in the presence of p-toluenesulfonic acid to form the corresponding enol triacetate indicated in the equation. The keto group at C–20 of these compounds was selectively reduced, the double bond between C–3 and C–4 was saturated and the acetyl groups at C–3 and C–21 were hydrolyzed, all in one step, by reaction with sodium borohydride in methanol solution. The free hydroxyl groups were then acetylated and thus there was prepared the corresponding tetraacetates of Δ⁵-pregnen-3β,17α,20,21-tetrol-11-one and the 9α-chloro and 9α-fluoro derivatives thereof.

The double bond of the tetraacetate of Δ⁵-pregnen-3β,17α,20,21-tetrol-11-one or its corresponding 9α-halo analogue was epoxidized to form the corresponding 5α,6α-epoxide. The epoxide ring was now opened by reaction with boron trifluoride etherate and thus we obtained the 3,17,20,21-tetraacetate of the corresponding 6β-fluoro-pregnan-3β,5α,17α,20,21-pentol-11-one. The acetyl groups at C–3, 20 and 21 were preferentially saponified by reaction with perchloric acid in methanol solution, the hydroxyl group at C–21 was preferentially reacetylated by reaction with 1.1 mols of acetic anhydride at low temperature and the free hydroxyl groups of the resulting 17,21-diacetate of 6β-fluoro-pregnan-3β,5α,17α,20,21-pentol were oxidized to form the 17,21-diacetate of the corresponding 6β-fluoro-pregnan-5α,17α,21-triol-3,11,20-trione.

Treatment of these last mentioned compounds with dry hydrogen chloride in acetic acid solution caused the dehydration at C–5 with simultaneous inversion of the steric configuration of the fluorine atom to produce the 17,21-diacetate of 6α-fluoro-cortisone or its 9α-halo homologues above shown.

Alternatively, the 6β-fluoro-pregnan-5α,17α,21-triol-3,11,20-trione derivatives were treated in pyridine solution with thionyl chloride at a temperature of around 0° C., and thus we achieved the dehydration without simultaneous inversion of the steric configuration of the fluorine atom, to produce the diacetate of the corresponding 6β-fluoro-cortisone.

Treatment of this diacetate in acetic acid solution with dry hydrogen chloride caused its conversion into the diacetate of 6α-fluoro-cortisone or its corresponding 9α-halo analogue.

Finally, the 17,21-diacetate of 6β-fluoro-pregnan-5α,17α,21-triol-3,11,20-trione, or its 9α-halo analogue, were converted into 6β-fluoro-cortisone or its 9α-halo-analogues by treatment with methanolic potassium hydroxide, since this dehydration is accompanied by the hydrolysis of the acetylated groups.

The acetoxyl groups of the 6α-fluoro and 6β-fluoro derivatives of cortisone and its 9α-halo homologues were hydrolyzed, preferably by reaction with methanolic potassium hydroxide, since this dehydration is accompanied by the hydrolysis of the acetylated groups.

The acetoxyl groups of the 6α-fluoro and 6β-fluoro derivatives of cortisone and its 9α-halo homologues were hydrolyzed, preferably by reaction with methanolic potassium hydroxide, to form the corresponding free diols.

Furthermore, we prepared at 21-esters of the 6β-fluoro-cortisone and its 9α-halo homologues by conventional methods, which esters were preferably those derived from hydrocarbon carboxylic acids having less than 12 carbon atoms.

The following specific examples serve to illustrate but are not intended to limit the present invention.

*Example 1*

A solution of 5 g. of the 21-acetate of 6α-fluoro-hydrocortisone in 50 cc. of pyridine was cooled to 0° C. and treated dropwise under stirring with 5 cc. of thionyl chloride, taking care that the temperature of the mixture did not rise over 0° C. The mixture was stirred for 24 hours further at 0° C. and then it was poured into ice water and extracted with ethyl acetate. The extract was washed with water, dilute hydrochloric acid, 5% sodium carbonate solution and again with water, dried over anhydrous sodium sulfate and evaporated to dryness under reduced pressure. Crystallization of the residue from acetone-hexane yielded the 21-acetate of 6α-fluoro-Δ⁴,⁹⁽¹¹⁾-pregnadien-17α,21-diol-3,20-dione.

A solution of 2.5 g. of this diene in 25 cc. of pure dioxane containing 4 cc. of 0.4 normal perchloric acid was treated at room temperature and in the absence of light with 1.2 g. of N-bromoacetamide which was added under stirring in the course of one hour. The mixture was stirred for one hour further and treated with 10% sodium sulfite solution until the test with starch-potassium iodide paper failed to give a blue color. 30 cc. of chloroform was then added, the organic layer was separated and consecutively washed with water, sodium bicarbonate solution and water. The extract was evaporated to dryness under vacuum in a bath below 25° C. Trituration of the residue with about 10 cc. of acetone and cooling afforded the 21-acetate of 6α-fluoro-9α-bromo-hydrocortisone in crystalline form. Concentration of the mother liquors gave an additional crop of the same compound.

*Example II*

A solution of 2.5 g. of the 21-acetate of 6α-fluoro-9α-bromo-hydrocortisone in 10 cc. of dioxane was slowly added to a mixture of 1.6 g. of anhydrous potassium acetate and 20 cc. of absolute ethanol which was previously heated to the boiling point. The mixture was refluxed for 45 minutes, cooled and diluted with 50 cc. of ice water, under stirring. The precipitate was collected by filtration, washed with water and dried, thus giving the 21-acetate of 6α-fluoro-9β,11β-oxido-$\Delta^4$-pregnen-17α,21-diol-3,20-dione.

2 g. of this epoxide was dissolved in 20 cc. of pure chloroform, cooled to 0° C. and mixed under stirring with 4 cc. of a 0.5 normal solution of dry hydrogen chloride in chloroform, while the mixture was maintained at 0° C. The mixture was stirred for one hour at the same temperature and then poured into water. The chloroform layer was separated and washed with water, 5% sodium carbonate solution and water, dried over anhydrous sodium sulfate and evaporated to dryness under reduced pressure. Crystallization of the residue from acetone furnished the 21-acetate of 6α-fluoro-9α-chloro-hydrocortisone.

*Example III*

In a polyethylene flask, fitted with a mechanical stirrer, there was dissolved 2.5 g. of the 21-acetate of 6α-fluoro-9β,11β-oxido-$\Delta^4$-pregnen-17α,21-diol-3,20-dione, obtained as described in Example II, in 40 cc. of pure chloroform. The solution was cooled to 0° C. and mixed in the course of 20 minutes, with stirring, with 0.4 g. of anhydrous hydrogen fluoride. The mixture was stirred for 2 hours at 0° C. and then neutralized by the addition of aqueous sodium bicarbonate.

The reaction mixture was transferred to a separatory funnel, washed with water and concentrated under reduced pressure until a bulky precipitate separated. The mixture was cooled and the precipitate was collected and redissolved in 10 cc. of hot ethyl acetate. The solution was filtered from some insoluble material and cooled, thus yielding the 21-acetate of 6α,9α-difluoro-hydrocortisone.

*Example IV*

A mixture of 1 g. of the above compound, 50 cc. of anhydrous t-butanol, 300 mg. of selenium dioxide and 0.1 cc. of pyridine was refluxed under an atomsphere of nitrogen for 70 hours, cooled and filtered through celite after dilution with ethyl acetate. The filter was well washed with ethyl acetate and the filtrate and washings were combined and evaporated to dryness under reduced pressure. The residue was triturated with water and the precipitate was collected, dried and purified by chromatography, thus producing the 21-acetate of 6α,9α-difluoro-prednisolone.

By the same method there was introduced an additional double bond between C–1 and C–2 into the 6α-fluoro-9α-bromo and 6α-fluoro-9α-chloro derivatives of hydrocortisone, obtained as described in Examples I and II, to produce the 21-acetates of 6α-fluoro-9α-bromo-prednisolone and 6α-fluoro-9α-chloro prednisolone, respectively.

*Example V*

5 g. of the 21-acetate of 6α-fluoro-prednisolone was treated, in pyridine solution, with thionyl chloride and the product of this dehydration was worked up in exactly the same way as described in Example I for these steps. There was thus obtained the 21-acetate of 6α-fluoro-$\Delta^{1,4,9(11)}$-pregnatrien-17α,21-diol-3,20-dione.

Subsequently, there were applied to this compound the reactions of Examples I, II and III, namely the reaction with N-bromoacetamide, the formation of the epoxide and the introduction of chlorine or fluorine at C–9α. There were thus obtained the 21-acetates of 6α-fluoro-9α-bromo-prednisolone, of 6α-fluoro-9β,11β-oxido-$\Delta^{1,4}$-pregnadien-17α,21-diol-3,20-dione, of 6α-fluoro-9α-chloro-prednisolone and of 6α,9α-difluoro-prednisolone, respectively.

*Example VI*

A solution of 1 g. of the 21-acetate of 6α-fluoro-9α-bromo-hydrocortisone, obtained in accordance with Example I, in 30 cc. of acetic acid was treated under stirring and at a temperature below 20° C. with a solution of 150 mg. of chromium trioxide in 6 cc. of 80% acetic acid, which was added dropwise. The mixture was kept standing at room temperature for 2 hours and then poured into ice water. The precipitate was collected by filtration, washed with water, dried and recrystallized from acetone-hexane, thus yielding the 21-acetate of 6α-fluoro-9α-bromo-cortisone. Dehydrogenation of this compound by the action of selenium dioxide, as described in Example IV, furnished the 21-acetate of 6α-fluoro-9α-bromo-prednisone.

By the same method there were oxidized and dehydrogenated the 6α-fluoro-9α-chloro- and 6α,9α-difluoro derivatives of hydrocortisone, obtained in accordance with Examples II and III, to give the corresponding derivatives of cortisone and prednisone, respectively.

By the same method of oxidation described above, the 21-acetates of the 6α,9α-dihalo derivatives of prednisolone were converted into those of prednisone, namely the 21-acetate of 6α-fluoro-9α-bromo-prednisone, the 21-acetate of 6α-fluoro-9α-chloro-prednisone and the 21-acetate of 6α,9α-difluoro-prednisone, respectively.

*Example VII*

A solution of 1 g. of the 21-acetate of 6α,9α-difluoro-prednisone in 200 cc. of methanol was cooled to 0° C. and mixed with 120 mg. of sodium methoxide, under an atmosphere of nitrogen and taking care that the temperature was maintained at 0° C. After 15 minutes at 0° C., the mixture was neutralized with acetic acid, evaporated to dryness under vacuum and the residue was triturated with water. The precipitate was collected and recrystallized from acetone, thus producing the free 6α,9α-difluoro-prednisone.

By a similar method there were saponified the 21-acetoxy groups of all of the 6α-fluoro-9α-halo compounds obtained in accordance with the previous examples to form the corresponding 21-hydroxy compounds.

*Example VIII*

A mixture of 1 g. of the free 6α-fluoro-9α-chloro-prednisolone, 20 cc. of pyridine and 1 cc. of propionic anhydride was kept standing overnight at room temperature and then poured into ice water. The product was extracted with ethyl acetate and the extract was successively washed with water, dilute hydrochloric acid, water, sodium bicarbonate solution and water, dried over anhydrous sodium sulfate and evaporated to dryness. The residue crystallized from acetone-hexane to give the 21-propionate of 6α-fluoro-9α-chloro-prednisolone.

Similarly, the reaction with anhydrides or chlorides of hydrocarbon carboxylic acids of less than 12 carbon atoms furnished the corresponding 21-esters of all of the 6α-fluoro-9α-halo compounds prepared in accordance with the methods described in the previous examples. Specifically there were prepared the 21-acetates, propionates, cyclopentylpropionates and benzoates.

Example IX 3 g. of p-toluenesulfonic acid was added to a solution of 5 g. of the 21-acetate of cortisone in 250 cc. of acetic anhydride and the mixture was kept standing for 70 hours at room temperature with occasional stirring. It was then poured into water, the precipitate was filtered, washed to neutral, air dried and crystallized from methanol, thus giving the triacetate of $\Delta^{3,5}$-pregnadien-3,17$\alpha$, 21-triol-11,20-dione.

4 g. of this triol-dione was dissolved in 200 cc. of methanol, cooled in an ice bath and slowly mixed with constant stirring with a solution of 2 g. of sodium borohydride in 20 cc. of water, while the temperature was maintained below 0° C. The stirring was continued at this temperature for 2 hours further and the mixture was neutralized with acetic acid, concentrated under reduced pressure to a volume of 30 cc. and diluted with 200 cc. of water; the precipitate of the 17-acetate of $\Delta^5$-pregnen-3$\beta$,17$\alpha$,20,21-tetrol-11-one was filtered, dried, dissolved in 20 cc. of pyridine and treated with 4 cc. of acetic anhydride. After keeping the mixture overnight at room temperature it was poured into water and the precipitate was filtered and recrystallized from acetone-hexane, thus giving the tetraacetate of $\Delta^5$-pregnen-3$\beta$,17$\alpha$,20,21-tetrol-11-one.

3 g. of the tetraacetate of $\Delta^5$-pregnen-3$\beta$,17$\alpha$,20,21-tetrol-11-one dissolved in 300 cc. of chloroform was mixed with 1.5 mols of monoperphthalic acid in ether solution and then kept at room temperature for 20 hours. Water was added, the organic layer was separated and washed with water, sodium bicarbonate solution and again with water, dried over anhydrous sodium sulfate and evaporated to dryness under reduced pressure. There was thus obtained the crude tetraacetate of 5$\alpha$,6$\alpha$-oxido-pregnan-3$\beta$,17$\alpha$,20,21-tetrol-11-one which was purified by recrystallization from acetone-hexane.

A solution of 3 g. of this tetraacetate in 150 cc. of ether and 150 cc. of benzene was treated with 3 cc. of boron trifluoride etherate which was added slowly under stirring; the mixture was stirred for 3 hours further at room temperature and then washed with water, sodium bicarbonate solution and water, dried over anhydrous sodium sulfate and evaporated to dryness, thus leaving as a residue the crude 3,17,20,21-tetraacetate of 6$\beta$-fluoro-pregnan-3$\beta$,5$\alpha$,17$\alpha$,20,21-pentol-11-one which was used for the next stage without further purification.

The tetraacetate of this 6$\beta$-fluoro-pentolone was mixed with 50 cc. of a 0.2 normal solution of perchloric acid in methanol and refluxed for 2 hours, cooled and diluted with water. The precipitate was collected, washed with water and dried in vacuum, thus giving the crude 17-acetate of 6$\beta$-fluoro-pregnan-3$\beta$,5$\alpha$,17$\alpha$,20,21-pentol-11-one.

This monoacetate was dissolved in 20 cc. of pyridine, cooled to 0° C., treated with 1.1 mols of acetic anhydride and kept standing for 18 hours at 0° C. and then for 2 hours at around 25° C. The mixture was poured into water, the product was extracted with ethyl acetate and washed with water, dilute hydrochloric acid and water, dried over anhydrous sodium sulfate and evaporated to dryness. The residue consisted of the crude 17,21-diacetate of 6$\beta$-fluoro-pregnan-3$\beta$,5$\alpha$,17$\alpha$,20,21-pentol-11-one.

3 g. of the crude 17,21-diacetate of 6$\beta$-fluoro-pregnan-3$\beta$,5$\alpha$,17$\alpha$,20,21-pentol-11-one was dissolved in 150 cc. of acetone, cooled to 0° C. and treated dropwise under stirring at 0° C. with an oxidizing reagent prepared with 1.6 of chromium trioxide, 1.4 cc. of sulfuric acid and 2 cc. of water. The reagent was added in the course of 2 minutes and the stirring was continued for half an hour at 0° C. After diluting with water the product was extracted with ether and the extract was washed with water, dried over anhydrous sodium sulfate, filtered and evaporated to dryness. There was thus obtained the 17,21-diacetate of 6$\beta$-fluoro-pregnan-5$\alpha$,17$\alpha$,21-triol-3,11,20-trione in crude form.

The above diacetate was dissolved in 100 cc. of glacial acetic acid and a slow stream of dry hydrogen chloride was passed into the solution for 2 hours at a temperature of around 18° C. and then it was diluted with water. The product was extracted with ethyl acetate, washed with water, 5% sodium carbonate solution and water, dried over anhydrous sodium sulfate, filtered and evaporated to dryness. The residue consisted of the crude diacetate of 6$\alpha$-fluoro-cortisone which was purified by recrystallization from acetone-hexane.

3 g. of the crude diacetate of 6$\alpha$-fluoro-cortisone was dissolved in 30 cc. of 1% methanolic potassium hydroxide and kept for 2 hours at 0° C. under an atmosphere of nitrogen. The mixture was neutralized with acetic acid, diluted with water and extracted with ethyl acetate; the extract was washed with water, dried over anhydrous sodium sulfate and evaporated to dryness. Crystallization of the residue from acetone-hexane yielded 6$\alpha$-fluoro-cortisone.

Example X

A solution of 1 g. of the crude 17,21-diacetate of 6$\beta$-fluoro-pregnan-5$\alpha$,17$\alpha$,21-triol-3,11,20-trione, obtained in accordance with the previous example, in 10 cc. of pyridine was cooled to 0° C. and treated dropwise under stirring with 1 cc. of thionyl chloride, taking care that the temperature did not rise over 0° C. The mixture was stirred for a further 2 hours at 0° C. and then poured into water. The product was extracted with ethyl acetate, washed with dilute hydrochloric acid, 5% sodium carbonate solution and again with water to neutral, dried over anhydrous sodium sulfate and evaporated to dryness. The residue consisted of the crude 17,21-diacetate of 6$\beta$-fluoro-cortisone which was purified by crystallization from acetone-hexane.

This crude diacetate was dissolved in acetic acid and treated with dry hydrogen chloride such as has been described in the previous example, thus achieving the inversion of the steric configuration of the fluorine atom to give the diacetate of 6$\alpha$-fluoro-cortisone, identical to the one obtained in accordance with the previous example.

Example XI 1 g. of the crude 17,21-diacetate of 6$\beta$-fluoro-pregnan-5$\alpha$,17$\alpha$,21-triol-3,11,20-trione, obtained in accordance with Example IX, was treated with 30 cc. of 1% methanolic potassium hydroxide by the method described in that example, thus effecting the dehydration at C–5 and the hydrolysis of the acetylated groups to give 6$\beta$-fluoro-cortisone.

Example XII

The treatment of the diacetate of 6$\beta$-fluoro-cortisone, obtained in accordance with Example X, by the method of the previous example afforded 6$\beta$-fluoro-cortisone, identical to the one obtained in accordance with the previous example.

Example XIII

When the starting cortisone was substituted by its 9$\alpha$-chloro or its 9$\alpha$-fluoro analogs, respectively, and following the methods described in the previous Examples IX to XII, there were obtained the following intermediates: the triacetates of 9$\alpha$-chloro-$\Delta^{3,5}$-pregnadien-3,17$\alpha$,21-triol-11,20-dione and of 9$\alpha$-fluoro-$\Delta^{3,5}$-pregnadien-3,17$\alpha$,21-triol-11,20-dione; the tetraacetates of 9$\alpha$-chloro-$\Delta^5$-pregnen-3$\beta$,17$\alpha$,20,21-tetrol-11-one and of 9$\alpha$-fluoro-$\Delta^5$-pregnen-3$\beta$,17$\alpha$,20,21-tetrol-11-one; the tetraacetates of 9$\alpha$-chloro-5$\alpha$,6$\alpha$-oxido-pregnan-3$\beta$,17$\alpha$,20,21-tetrol-11-one and of 9$\alpha$-fluoro-5$\alpha$,6$\alpha$-oxido-pregnan-3$\beta$,17$\alpha$,20,21-tetrol-11-one; the 3,17,20,21-tetraacetates, 17-monoacetates and 17,21-diacetates of 6$\beta$- fluoro - 9α - chloro - pregnan - 3β,5α,17α,20,21 - pentol-11-one and of 6β,9α-difluoro-pregnan-3β,5α,17α,20,21-pentol-11-one; the 17,21-diacetates of 6β-fluoro-9α-chloro-pregnan-5α,17α,21-triol-3,11,20-trione and of 6β,9α-difluoro-pregnan-5α,17α,21-triol-3,11,20-trione; as well as the diacetates of 6β-fluoro-9α-chloro-cortisone, 6α-fluoro-9α-chloro-cortisone, 6β,9α-difluoro-cortisone and of 6α,9α-difluoro-cortisone. The final compounds were 6α-fluoro - 9α - chloro - cortisone, 6α,9α - difluoro - cortisone, 6β-fluoro-9α-chloro-cortisone and 6β,9α-difluoro-cortisone.

*Example XIV*

A solution of 1 g. of 6β-fluoro-cortisone in 10 cc. of pyridine was mixed with 0.5 g. of acetic anhydride and kept at room temperature for 4 hours. The mixture was poured into water, heated for half an hour on the steam bath and cooled. The precipitate was collected and crystallized from acetone-hexane, thus giving the 21-acetate of 6β-fluoro-cortisone.

When acetic anhydride was substituted by the anhydride or chloride of another hydrocarbon carboxylic acid, namely propionic, cyclopentylpropionic, benzoic etc., preferably having from up to 12 carbon atoms, there were obtained the corresponding 21-esters of 6β-fluoro-cortisone.

*Example XV*

By the same method to that described in the previous example, there were obtained the same 21-esters of 6β-fluoro-9α-chloro-cortisone and of 6β,9α-difluoro-cortisone.

We claim:

1. The tetraacetate of 5α,6α-oxido-pregnan-3β,17α,20,21-tetrol-11-one.

2. The tetraacetate of 9α-chloro-5α,6α-oxido-pregnan-3β,17α,20,21-tetrol-11-one.

3. The tetraacetate of 9α-fluoro-5α,6α-oxido-pregnan-3β,17α,20,21-tetrol-11-one.

4. The 3,17,20,21-tetraacetate of 6β-fluoro-pregnan-3β,5α,17α,20,21-pentol-11-one.

5. The 3,17,20,21-tetraacetate of 6β,9α-difluoro-pregnan-3β,5α,17α,20,21-pentol-11-one.

6. The 3,17,20,21-tetraacetate of 6β-fluoro-9α-chloro-pregnan-3β,5α,17α,20,21-pentol-11-one.

7. The 17-mono acetate of 6β-fluoro-pregnan-3β,5α,17α,20,21-pentol-11-one.

8. The 17-mono acetate of 6β,9α-difluoro-pregnan-3β,5α,17α,20,21-pentol-11-one.

9. The 17-mono acetate of 6β-fluoro-9α-chloro-pregnan-3β,5α,17α,20,21-pentol-11-one.

10. The 17,21-diacetate of 6β-fluoro-pregnan-3β,5α,17α,20,21-pentol-11-one.

11. The 17,21-diacetate of 6β,9α-difluoro-pregnan-3β,5α,17α,20,21-pentol-11-one.

12. The 17,21-diacetate of 6β-fluoro-9α-chloro-pregnan-3β,5α,17α,20,21-pentol-11-one.

13. The 17,21-diacetate of 6β-fluoro-pregnan-5α,17α,21-triol-3,11,20-trione.

14. The 17,21-diacetate of 6β-fluoro-9α-chloro-pregnan-5α,17α,21-triol-3,11,20-trione.

15. The 17,21-diacetate of 6β,9α-difluoro-pregnan-5α,17α,21-triol-3,11,20-trione.

References Cited in the file of this patent

UNITED STATES PATENTS

| | | |
|---|---|---|
| 2,837,464 | Nobile | June 3, 1958 |
| 2,838,497 | Spero et al. | June 10, 1958 |
| 2,838,498 | Magerlein et al. | June 10, 1958 |
| 2,838,499 | Spero et al. | June 10, 1958 |
| 2,841,600 | Hogg et al. | July 1, 1958 |